United States Patent
Kondo et al.

(10) Patent No.: US 6,433,828 B1
(45) Date of Patent: Aug. 13, 2002

(54) PICTURE CONVERSION USING FIELD-BY-FIELD VERTICAL INVERSION DEPENDENT UPON THE TYPE OF PICTURE SIGNAL TO BE OUTPUTTED

(75) Inventors: Tetsujiro Kondo; Masashi Uchida, both of Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/395,010

(22) Filed: Sep. 13, 1999

(30) Foreign Application Priority Data

Sep. 14, 1998 (JP) .......................................... 10-260626

(51) Int. Cl.[7] ................................................. H04N 7/01
(52) U.S. Cl. ........................................ 348/458; 348/441
(58) Field of Search .................................. 348/458, 459, 348/448, 441, 558; 382/249–301, 224

(56) References Cited

U.S. PATENT DOCUMENTS

| 5,049,990 A | | 9/1991 | Kondo et al. | |
| 5,469,216 A | * | 11/1995 | Takahashi et al. | 348/441 |
| 5,719,633 A | * | 2/1998 | Nishio et al. | 348/441 |
| 5,828,415 A | * | 10/1998 | Keating et al. | 348/458 |
| 5,835,150 A | * | 11/1998 | Choi | 348/441 |
| 5,903,481 A | | 5/1999 | Kondo et al. | |
| 6,057,885 A | * | 5/2000 | Horishi et al. | 348/450 |
| 6,115,073 A | * | 9/2000 | Horishi et al. | 348/458 |

* cited by examiner

*Primary Examiner*—Victor R. Kostak
(74) *Attorney, Agent, or Firm*—Frommer Lawrence & Haug LLP; William S. Frommer

(57) ABSTRACT

A field-by-field vertical inverter selectively performs a vertical inverting process for an input picture signal for each field as a function of the relationship between the type of the input picture signal and the type of the output picture signal. A picture extractor extracts picture data at a predetermined position of the vertical inverting processed input picture signal. A class code is generated as a function of the extracted picture data, and this extracted picture data is used with conversion information data that is stored for each class code to generate the output picture signal.

20 Claims, 12 Drawing Sheets

CLASS CATEGORIZING PROCESS

NON-EDGE MATCHING
ADRC PROCESS

PICTURE CONVERSION USING FIELD-BY-FIELD VERTICAL INVERSION DEPENDENT UPON THE TYPE OF PICTURE SIGNAL TO BE OUTPUTTED

BACKGROUND OF THE INVENTION

1. Field of the Invention

The present invention relates to a picture information converting apparatus and a picture information converting method.

2. Description of the Related Art

In high audio-visual environments, television receivers that can display pictures with high resolution have been desired. To satisfy that, a so-called high-vision (high definition television) system has been developed. In the high-vision system, the number of scanning lines is 1125 that is more than twice of that of the conventional NTSC system. In the high-vision system, the aspect ratio—the ratio of the frame width to the frame height is 9:16 that is wider than 3:4 of the NTSC system. Thus, in the high-vision system, pictures that have high resolution and presence can be obtained.

When an NTSC format picture signal is supplied to a high-vision receiver, it cannot display a picture due to the difference of the signal format. To solve such a problem, with a picture information converting apparatus as shown in FIG. 1, the rate of the picture signal is converted. Referring to FIG. 1, an NTSC format picture signal as an SD (Standard Definition) signal is input from an input terminal 100 to a horizontal interpolation filter 101. The horizontal interpolation filter 101 performs a horizontal interpolation process for the NTSC format picture signal. The output signal of the horizontal interpolation filter 101 is supplied to a vertical interpolation filter 102. The vertical interpolation filter 102 performs a vertical interpolation process for the output signal of the horizontal interpolation filter 101. The vertical interpolation filter 102 outputs a high-vision format picture signal as an HD (High Definition) signal.

Next, with reference to FIG. 2, a practical structure of the horizontal interpolation filter 101 will be described., Referring to FIG. 2, an NTSC format picture signal is supplied from an input terminal 100 to (m+1) multiplying devices $111_m$, $111_{m-1}$, $111_{m-2}$, . . . , and $111_0$. The multiplying devices $111_m$, $111_{m-1}$, $111_{m-2}$, . . . , and $111_0$ multiply the received signal by respective coefficients and supply the calculated results to adding devices $112_{m-1}$, $112_{m-2}$, . . . , and $112_0$, respectively. Output signals of the adding devices $112_{m-1}$, $112_{m-2}$, . . . , and $112_0$ are supplied to delay. registers $113_{m-1}$, $113_{m-2}$, . . . , and $113_0$, respectively. Output signals of the delay registers $113_{m-1}$, $113_{m-2}$, . . . , and $113_0$, are supplied to adding devices $112_{m-2}$, $112_{m-3}$, . . . , and $112_0$, respectively.

An output signal of the multiplying device $111_m$ is supplied to a delay register $113_m$. An output signal of a delay register $113_m$ is supplied to the adding device $112_{m-1}$. The delay registers $113_{m-1}$, $113_{m-2}$, . . . , and $113_0$ delay their received signals by a delay time period T.

Thus, the NTSC format picture signal that is received through the input terminal 100 is supplied to the delay register $113_m$. The delay register $113_m$ delays the NTSC format picture signal by a time period T. The resultant picture signal is supplied to the adding device $112_{m-1}$. The adding device $112_{m-1}$ adds the output signal of the delay register $113_m$ and the output signal of the multiplying device $113_{m-1}$ and supplies the resultant signal to the delaying device $113_{m-1}$. The delay register $113_{m-1}$ delays the output signal of the adding device $112_{m-1}$ by the time period T and supplies the resultant signal to the adding device $112_{m-2}$. The adding device $112_{m-2}$ adds the output signal of the delay register $113_{m-2}$ and the output signal of the multiplying device $111_{m-2}$ and supplies the resultant signal to the next delaying device.

Next, the similar process is repeatedly performed. The adding device $112_0$ on the last stage adds the output signal of the delay register $113_0$ and the output signal of the multiplying device $111_0$ and supplies the resultant signal as the final output signal of the horizontal interpolation filter 101 (namely, the output picture signal of the horizontal interpolation process) to the vertical interpolation filter 102 through an output terminal 120.

The structure of the vertical interpolation filter 102 is similar to that of the horizontal interpolation filter 101. The vertical interpolation filter 101 performs a vertical interpolation process for the output signal of the horizontal interpolation filter 101 and supplies the resultant signal as a high-vision format picture signal to a high-vision receiver. In such a picture information converting process, an NTSC format picture signal can be displayed on a high-vision receiver.

In the above-described picture information converting process, an NTSC format picture signal is simply interpolated in the horizontal direction and the vertical direction. Thus, the resolution of the converted picture signal is the same as that of the original picture signal. In particular, when a normal moving picture is converted, the vertical interpolation process is performed as an intra-field process. In such a process, since the inter-field correlation of the picture is not used, due to a conversion loss, the resolution of the converted picture signal may deteriorate against that of the original picture signal.

To solve such a problem, the applicant of the present invention has proposed an apparatus that performs a class categorization adaptive process as a picture information converting process (see Japanese Patent Laid-Open Publication No. 6-205934). In the class categorization adaptive process, an input SD signal is categorized as a class corresponding to a three-dimensional (time-space) distribution of the signal level. Predictive coefficients pre-learnt for individual classes are stored in a memory. With the results of the class categorization and the predictive coefficients, a calculation corresponding to a predetermined predictive expression is performed so as to generate an optimum estimated value as an HD pixel.

In the class categorization adaptive process, with SD pixel data present in the vicinity of an HD pixel to be generated, the class categorization process is performed. Predictive coefficients are pre-leant for individual classes detected in the class categorization process. For a still picture portion, using the intra-frame correlation, an HD pixel value closer to a real value is obtained. For a moving picture portion, using the inter-field correlation, an HD pixel value closer to a real value is obtained.

Next, a real example of such a process for generating HD pixels y1 and y2 shown in FIG. 3 will be described. The averages of frame differences of pixels present at the spatially same position are obtained for SD pixels m1 to m5 and SD pixels n1 to n5. The obtained values are categorized as motion classes using predetermined threshold values. In addition, SD pixels k1 to k5 shown in FIG. 4 are processed by ADRC (Adaptive Dynamic Range Coding) method. Thus, with a small number of bits, a class categorization that represents a spatial waveform can be performed.

For each class determined by the above-described two types of class categorizations, HD pixels y1 and y2 are generated by a calculation corresponding to the following linear expression (1).

$$y = w1 \times x1 + w2 \times x2 + \ldots + wn \times xn \quad (1)$$

FIG. 5 shows an example of the arrangement of SD pixels x1, x2, . . . , and xn used in such a calculation. In this example, 17 SD pixels (n=17) are used. The predictive coefficients w1 to wn used in formula (1) are pre-learnt. In such a process, since the class categorization that represents the amount of a motion and the class categorization that represents a spatial waveform are independently and adaptively preformed, a high conversion capability can be accomplished with a relatively small number of classes.

In such a class categorization adaptive process, an interlace signal with scanning lines twice as many as that of an input interlace signal can be obtained. For example, a 525i signal as an input picture signal can be converted into a 1050i signal as an output. picture signal. Thus, the picture becomes dense and thereby the picture quality thereof improves.

In the class categorization adaptive process, an input interlace signal can be converted into a progressive signal with the same number of scanning lines. For example, a 525i signal as an input picture signal can be converted into a 525p signal as an output picture signal. Thus, as an effect of the converting process, line flicker can be removed.

Although such two types of conversions have respective effects, if they are accomplished with one apparatus, memories that store predictive coefficients for these conversions are required. Thus, the circuit scale of the apparatus becomes large.

OBJECTS AND SUMMARY OF THE INVENTION

The present invention is made from the above-described point of view. An object of the present invention is to provide a picture information converting apparatus and a picture information converting method that allow an input picture signal to be converted into two or more types of output picture signals without need to increase the circuit scale of the apparatus or with a minimum increase thereof. A first aspect of the present invention is a picture information converting apparatus for generating an output picture signal with a scanning line structure different from an input picture signal, comprising a field-by-field vertical inverting means for selectively performing a vertical inverting process for the input picture signal for each field corresponding to the type of the input picture signal and the type of the output picture signal, a first picture extracting means for extracting picture data at a predetermined position of the input picture signal, a motion class detecting means for determining a motion class that represents a motion with the picture data extracted by the first picture extracting means and outputting information corresponding to the determined motion class, a second picture extracting:means for extracting picture data at a predetermined position from the input picture signal, a spatial class detecting means for detecting a pattern of a level distribution of picture data extracted by the second picture extracting means, determining a spatial class of the picture data corresponding to the detected pattern, and outputting information that represents the spatial class, a class code generating means for combining an output signal of the motion class detecting means and an output signal of the spatial class detecting means, a storing means for storing predetermined coefficient data predetermined corresponding to an output signal of the class code generating means, a third picture extracting means for extracting picture data at a predetermined position from the input picture signal, and a calculation process means for performing a calculation for estimating an output picture signal corresponding to an output signal of the class code generating means with predictive coefficient data selected by the storing means and picture data selected by the third picture data selecting means.

A second aspect of the present invention is a picture information converting method for generating an output picture signal with a scanning line structure different from an input picture signal, comprising the steps of (a) selectively performing a vertical inverting process for the input picture signal for each field corresponding to the type of the input picture signal and the type of the output picture signal, (b) extracting picture data at a predetermined position of the input picture signal, (c) determining a motion class that represents a motion with the picture data extracted at step (b) and outputting information corresponding to the determined motion class, (d) extracting picture data at a predetermined position from the input picture signal, (e) detecting a pattern of a level distribution of picture data extracted at step (d), determining a spatial class of the picture data corresponding to the detected pattern, and outputting information that represents the spatial class, (f) combining an output signal of step (c) and an output signal of step (e), (g) storing predetermined coefficient data predetermined corresponding to an output signal of step (f), (h) extracting picture data at a predetermined position from the input picture signal, and (i) performing a calculation for estimating an output picture signal corresponding to an output signal of step (f) with predictive coefficient data selected at step (g) and picture data selected at step (h).

According to the present invention, corresponding to the type of an input picture signal and the type of an output picture signal, field-by-field vertical inverting process is selectively performed. For the resultant signal, the picture information converting process is performed.

As described above, according to the present invention, before the picture information converting process is performed, the SD picture signal inverting process is selectively performed. Thus, with the same coefficient data, two or more types of HD picture signals can be generated.

Thus, it is not necessary to store different types of coefficient data for generating two or more types of HD picture signals. Consequently, when two or more types of HD picture signals are generated, it is not necessary to increase the storage capacity of the memory for storing the coefficient data. Thus, the circuit scale of the memory can be prevented from increasing.

Thus, an apparatus that has a function for generating two or more types of HD picture signals can be accomplished without need to increase the circuit scale and cost or with a minimum increase thereof.

As prior art references of the present invention, the following patent applications were filed by the applicant of the present invention and the following USP was granted thereto.

(1) Japanese Patent Application No. H09-115437 (U.S. patent application corresponding thereto is now pending), (2) Japanese Patent Application No. H10-228221 (U.S. patent application corresponding thereto is now pending), and (3) U.S. Pat. No. 5,049,990

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENT

Next, an embodiment of the present invention will be described The present invention can be applied for the case that a combination of an SD signal as an input picture signal and an HD signal as an output picture signal is combination of a 525i signal (an interlace signal with 525 scanning lines) and a 525p signal (a progressive signal with 525 scanning lines) and a combination of a 525i signal and a 1050i signal (an interlace signal with 1050 scanning lines).

Figure 1:
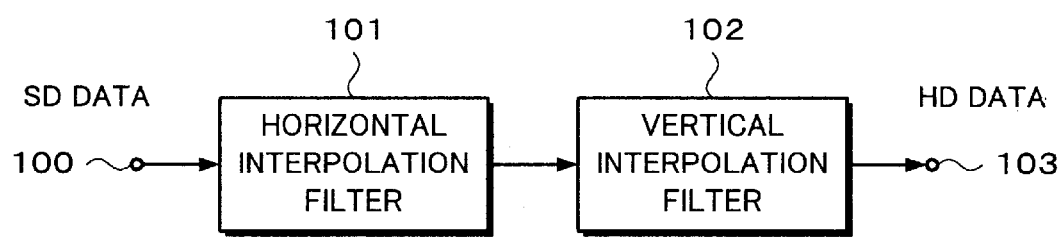
FIG. 1 is a block diagram for explaining a conventional picture information converting process.
Figure 2:
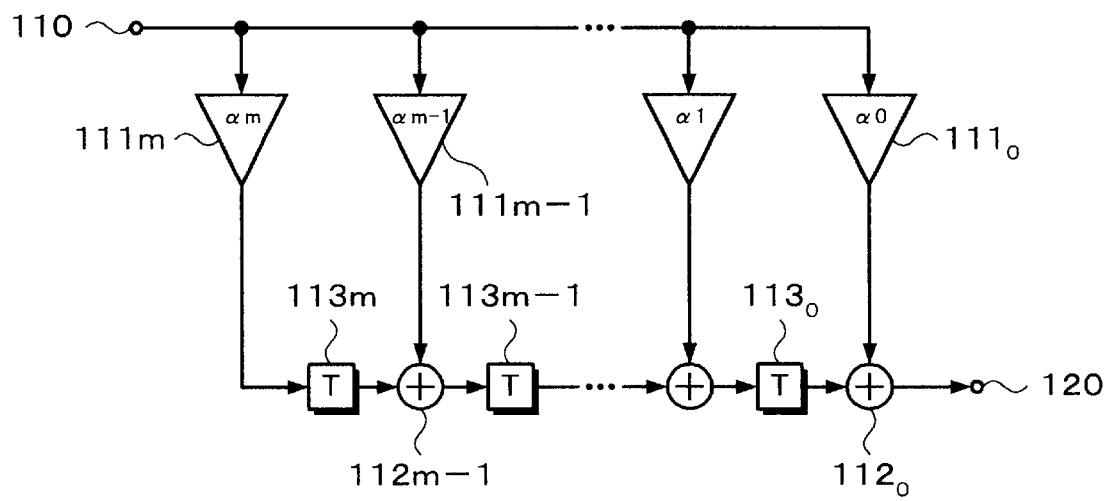
FIG. 2 is a block diagram for explaining the conventional picture information converting process in detail.
Figure 3:
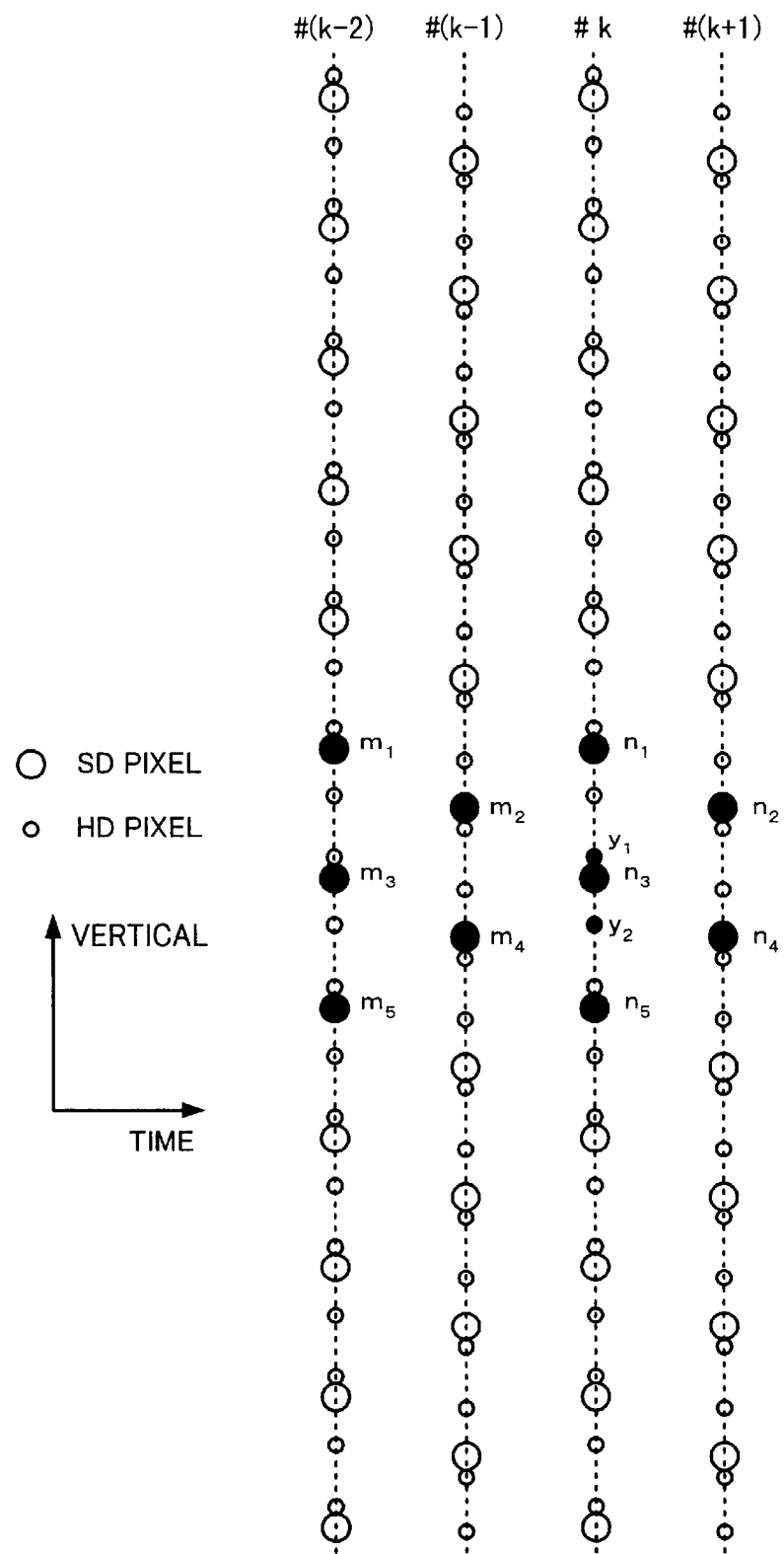
FIG. 3 is a schematic diagram showing an example of the arrangement of pixels for detecting a motion class in the conventional picture information converting process.
Figure 4:
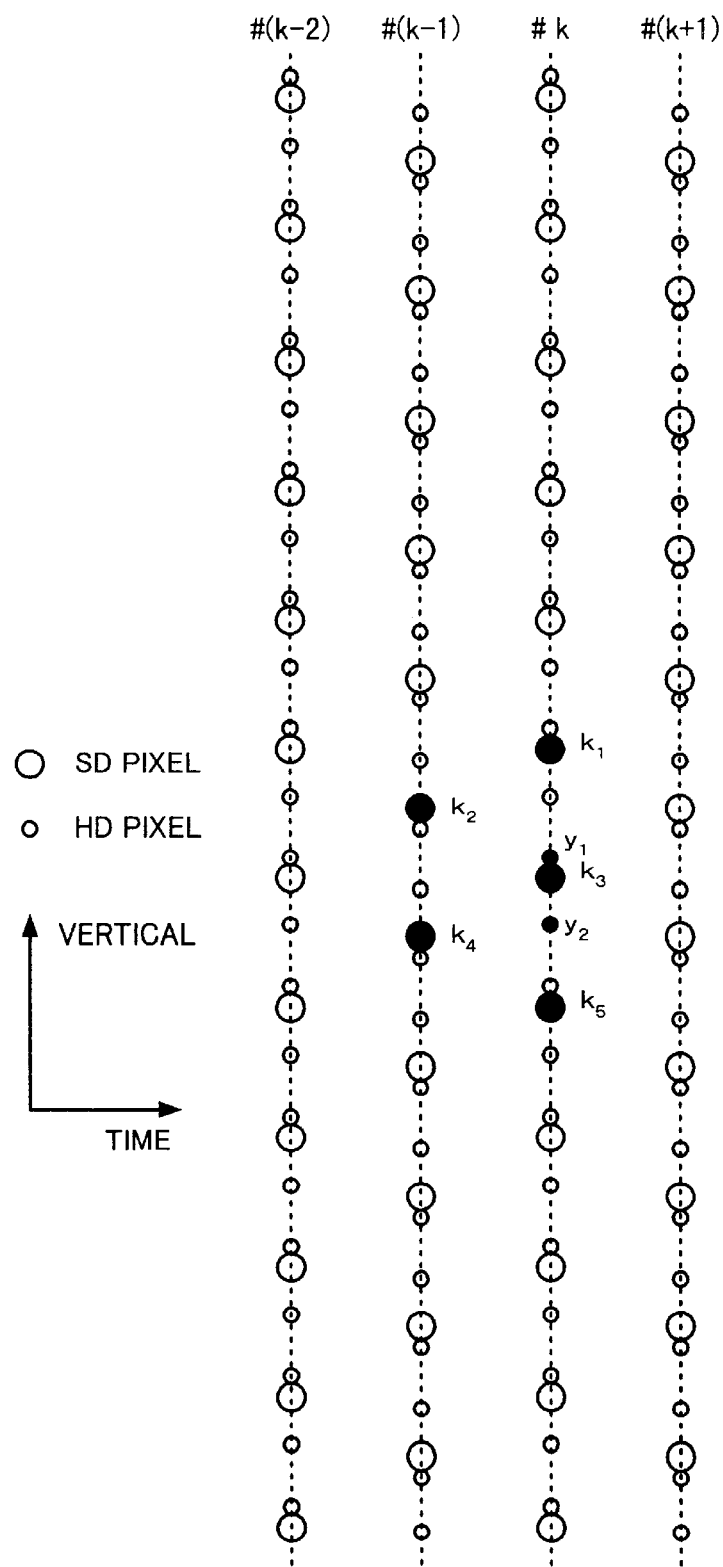
FIG. 4 is a schematic diagram showing an example of the arrangement of pixels used for detecting a spatial class in the conventional picture information converting process.
Figure 5:
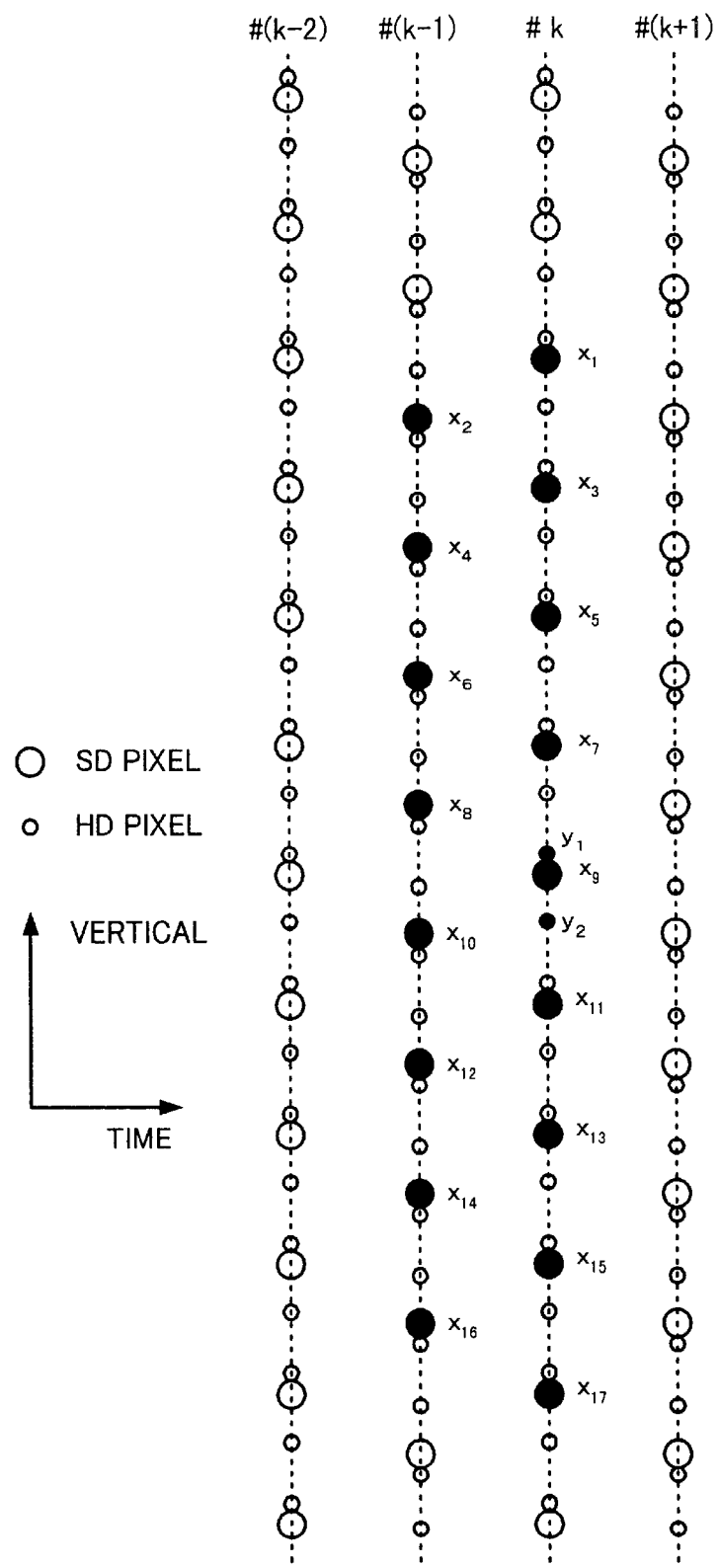
FIG. 5 is a schematic diagram showing an example of the arrangement of pixels used for estimating pixels of an output picture signal in the conventional picture information converting process.
Figure 6:
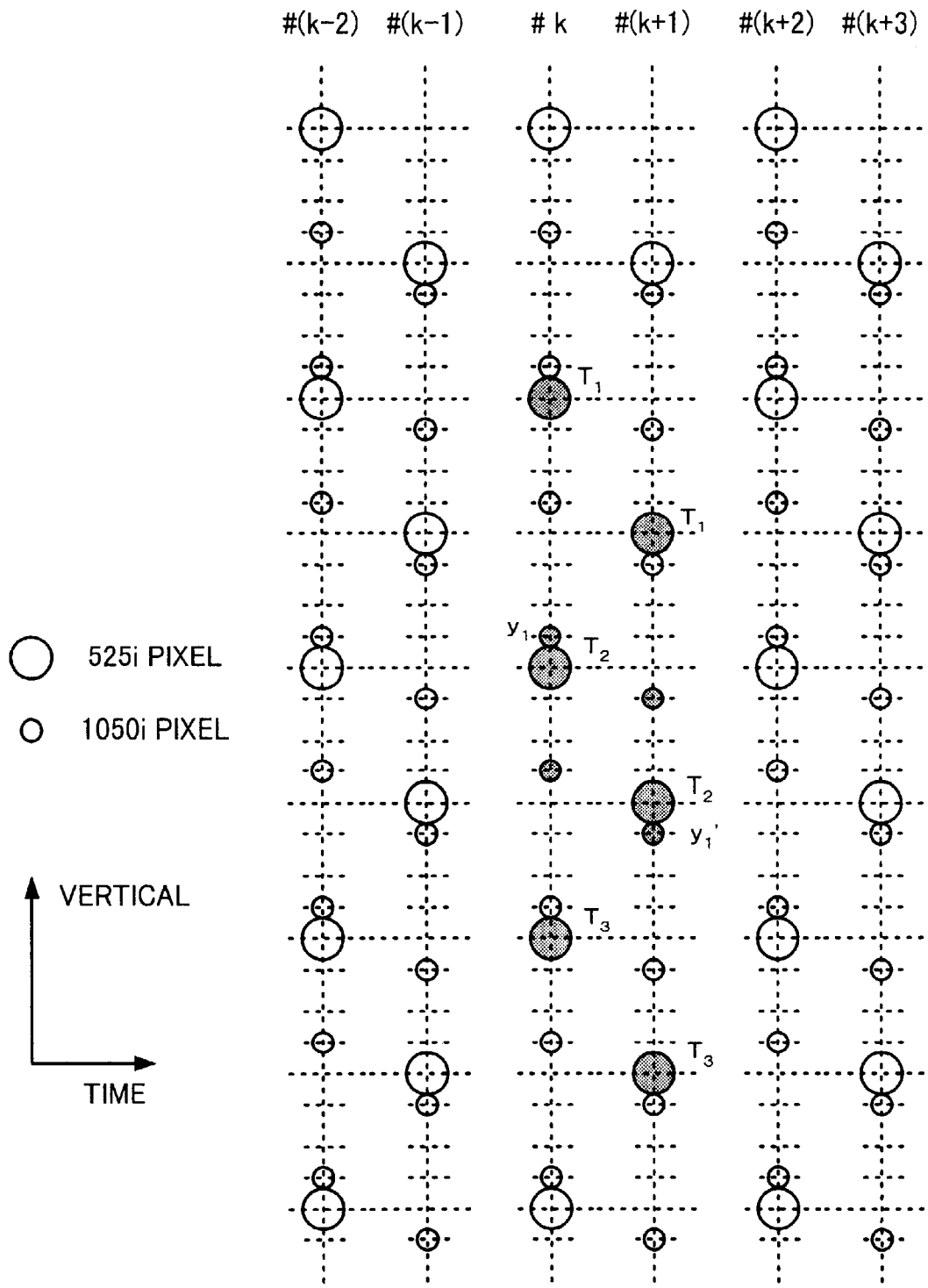
FIG. 6 is a schematic diagram showing an example of the arrangement of pixels according to an embodiment of the present invention.
Figure 7:
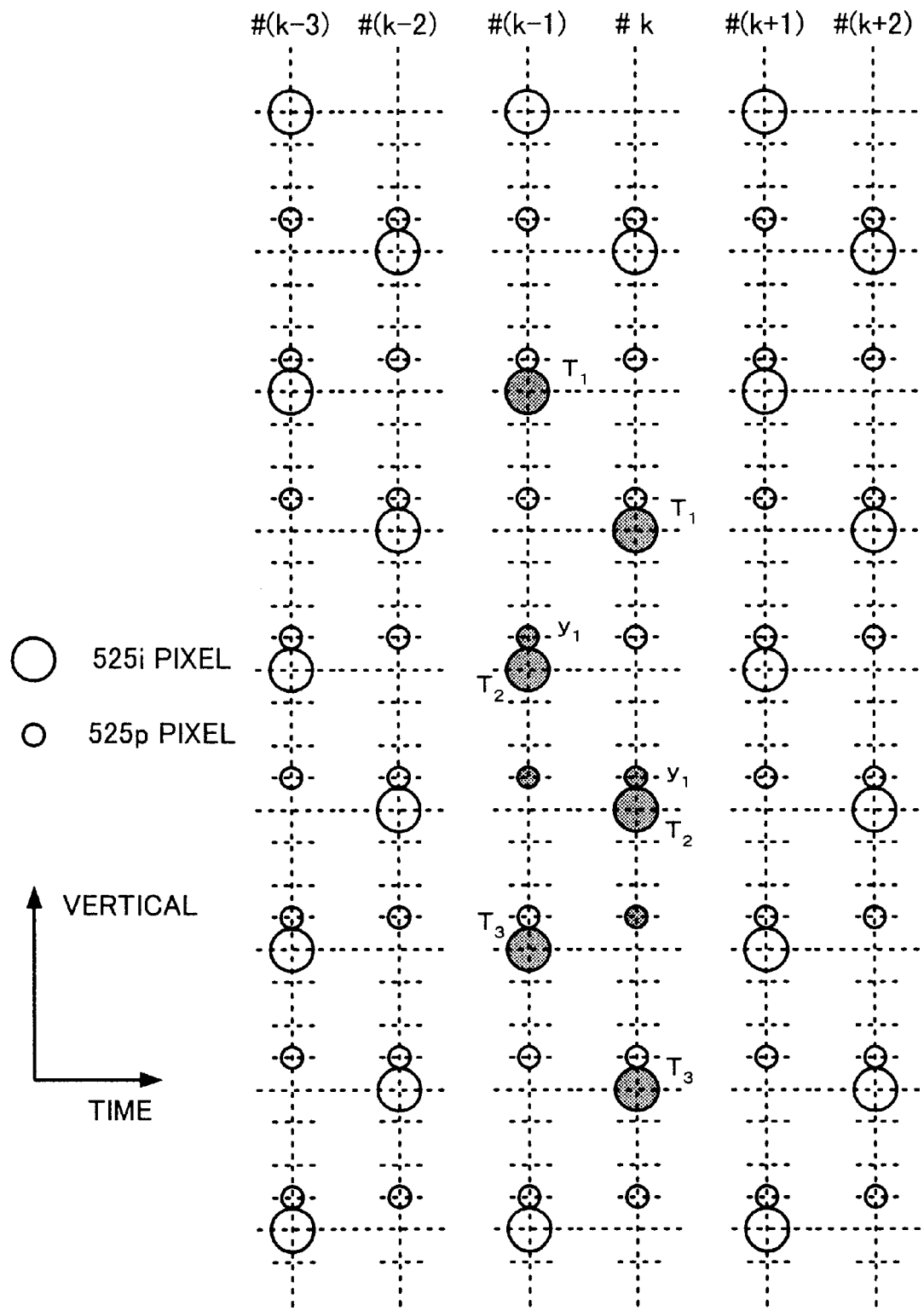
FIG. 7 is a schematic diagram showing another example of the arrangement of pixels according,to the embodiment of the present invention.

FIGS. 6 and 7 show the relation of positions of pixels of an SD picture signal of an input picture signal and pixels of an HD picture signal of an output picture signal. In FIGS. 6 and 7, large dots represent SD pixels, whereas small dots represent HD pixels. In FIGS. 6 and 7, the SD picture signal is a 525i signal. In FIG. 6, the HD picture signal is a 1050i signal. In FIG. 7, the HD picture signal is a 525p signal.

In the case that the HD picture signal is a 1050i signal as shown in FIG. 6, the relation of phases of HD pixels and SD pixels used for estimating the HD pixels of the first field (k-th field) of one frame is vertically inverted against that of the second field ((k+1)-th field) of the frame. In other words, when an HD pixel y1 of the first field and an HD pixel y1' of the second field are calculated with three SD pixels T1, T2, and T3, the HD pixels y1 and y1' are calculated with formulas (2) and (3), respectively. To estimated one HD pixel, three or more SD pixels may be used. However, for simplicity, an HD pixel is estimated with three SD pixels.

$$y1 = T1 \times k1 + T2 \times k2 + T3 \times k3 \quad (2)$$

$$y1' = T3 \times k1 + T2 \times k2 + T1 \times k3 \quad (3)$$

In the case that the HD picture signal is a 1050i signal, in two fields of one frame, the phases of SD pixels used for predicting an HD pixel are inverted in the vertical direction. Thus, after the input SD picture signal is inverted in each field, the picture information converting process is performed. Alternatively, when a calculation for estimating an HD pixel, the relation between predictive coefficients and SD pixels is changed in each field. Thus, a 525i signal as an SD picture signal can be converted into a 1050i signal as an :output picture signal.

On the other hand, in the case that the HD picture signal is a 525p signal as shown in FIG. 7, the relation of phases of HD pixels and SD pixels (for estimating the HD pixels) of the first field ((k−1)-th field) of one frame is the same as that of the second field (k-th field) of the frame. Thus, in this case, it is not necessary to invert the input SD picture signal in each field.

Figure 8:
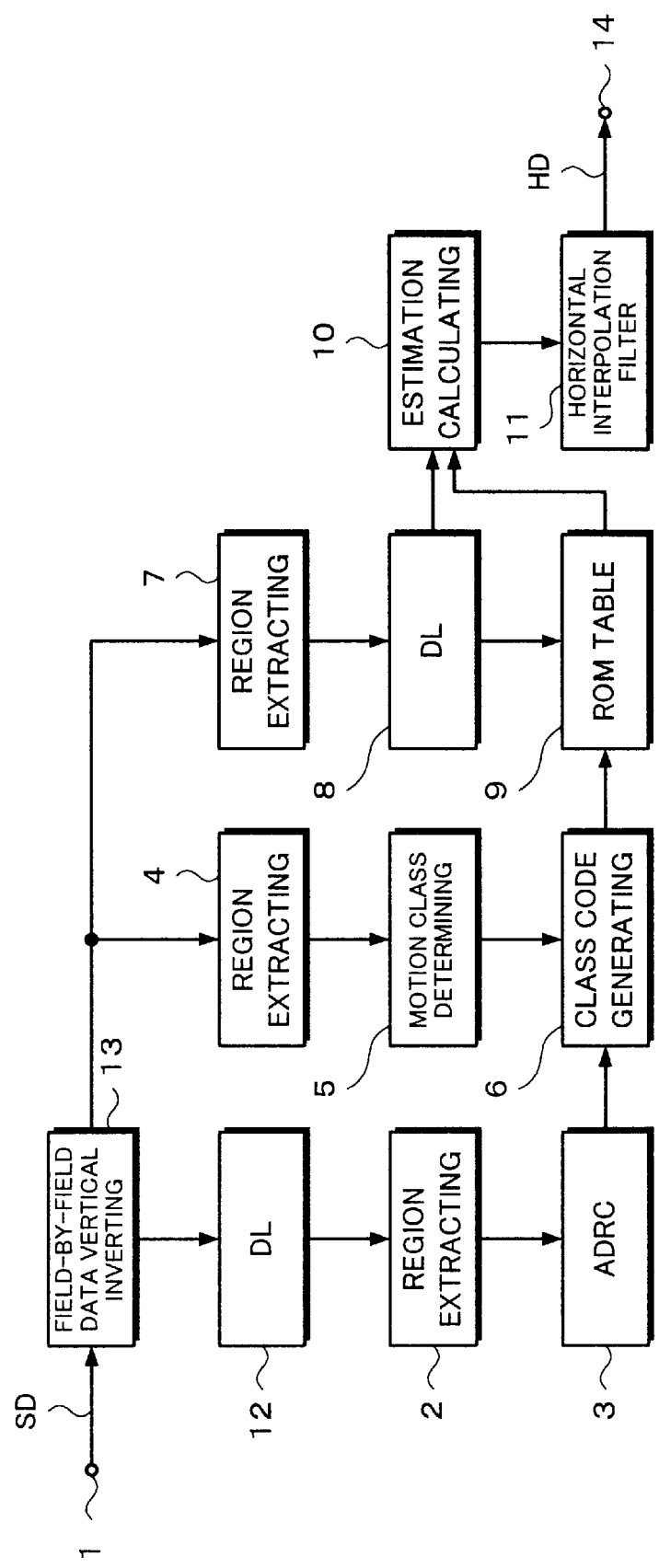
FIG. 8 is a block diagram showing an example of the overall structure of the embodiment of the present invention.

Consequently, according to the present invention, corresponding to the type of an output HD picture signal, an inverting process for an input SD picture signal is selectively performed. FIG. 8 is a block diagram showing the overall structure of the embodiment of the present invention. For example, a 525i signal as an SD picture signal is supplied from an input terminal 1 to a field-by-field data vertical inverting circuit 13. The field-by-field data vertical inverting circuit 13 selectively performs the vertical inverting process for the received SD picture signal.

The field-by-field data vertical inverting circuit 13 selectively performs the vertical inverting process corresponding to the type of the received HD picture signal. An output signal of the field-by-field data vertical inverting circuit 13 is supplied to region extracting portions 4 and 7 and a delaying circuit 12. The region extracting portion 4 extracts pixels necessary for determining a motion class. The region extracting portion 4 supplies the extracted pixels to a motion class determining circuit 5. The motion class determining circuit 5 detects the amount of a motion corresponding to for example block matching method.

Figure 9:
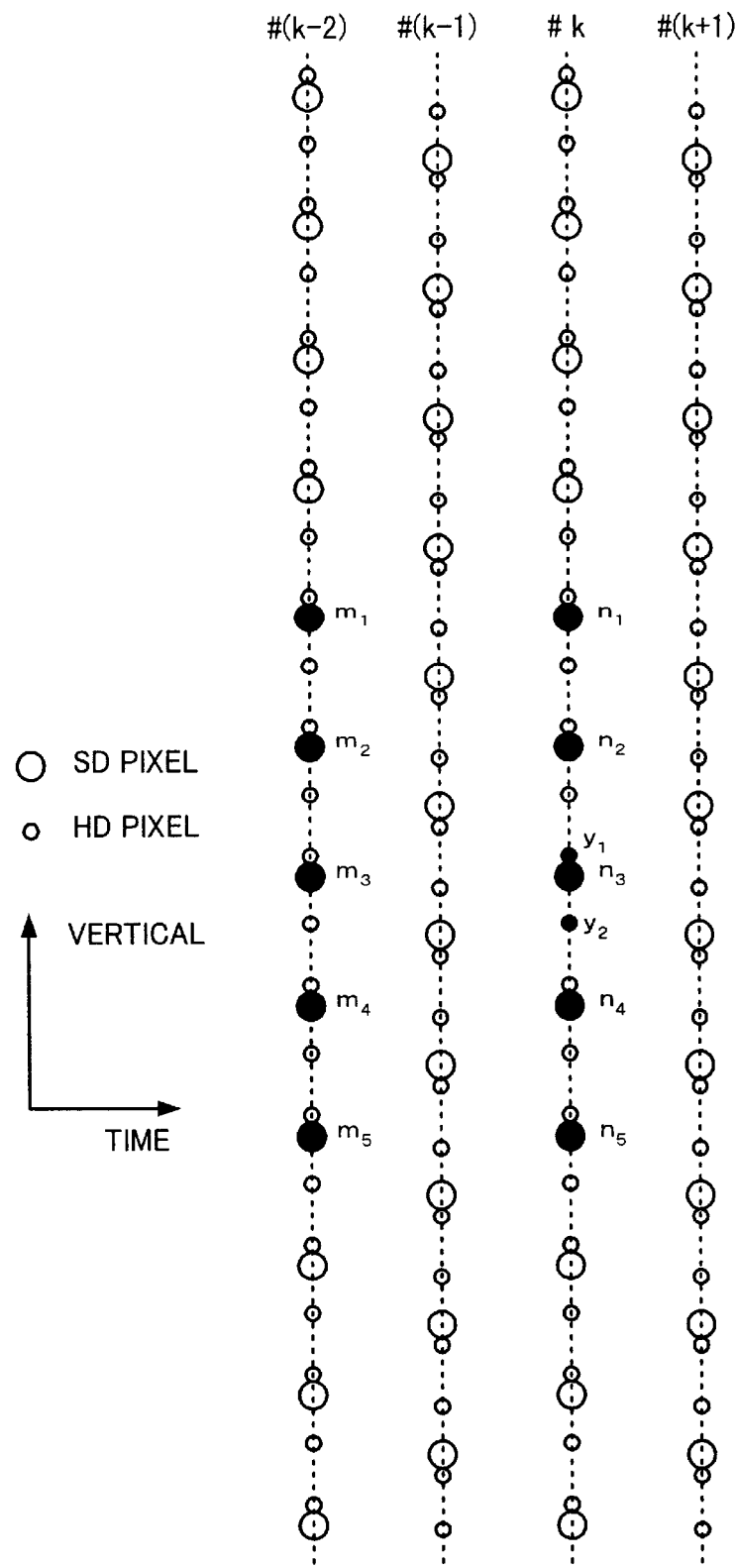
FIG. 9 is a schematic diagram showing an example of the arrangement of pixels used for detecting a motion class according to the embodiment of the present invention.

FIG. 9 s,hows an example of the arrangement of pixels extracted by the region extracting portion 4 that detects a motion class. To generate HD pixels y1 and y2, a first block of (5×5) SD pixels is extracted as block 1. In the center row of the block 1, there are pixels n1, n2 n3, n4, and n5. A second block of (5×5) SD pixels is extracted as a block 2. In the center row of the block 2, there are pixels m1, m2, m3, m4, and m5. A third block having an offset of one pixel in a predetermined search range of 25 pixels is extracted.

The motion class determining circuit 5 calculates a motion class mv_class corresponding to the following formula (4).

$$mv\_class = (vx+sx) \times (sy \times 2+1) + (vy+sy) \quad (4)$$

where vx represents the amount of a motion in the horizontal direction; vy represents the amont of the motion in the vertical direction; sx represents the absolute value in the horizontal search range; and sy represents the absolute value in the vertical search range.

When the search range of the amount of the motion is (±8, ±8) and the detected amount of the motion is (+3, −2), the motion class mv_class is calculated as follows.

$$mv\_class=(3+8)\times(8\times 2+1)+((-2)+8)=193$$

The motion may be detected by for example slope method or phase correlation method rather than block matching method. The detected motion class is supplied to a class code generating circuit 6 shown in FIG. 8.

Figure 10:
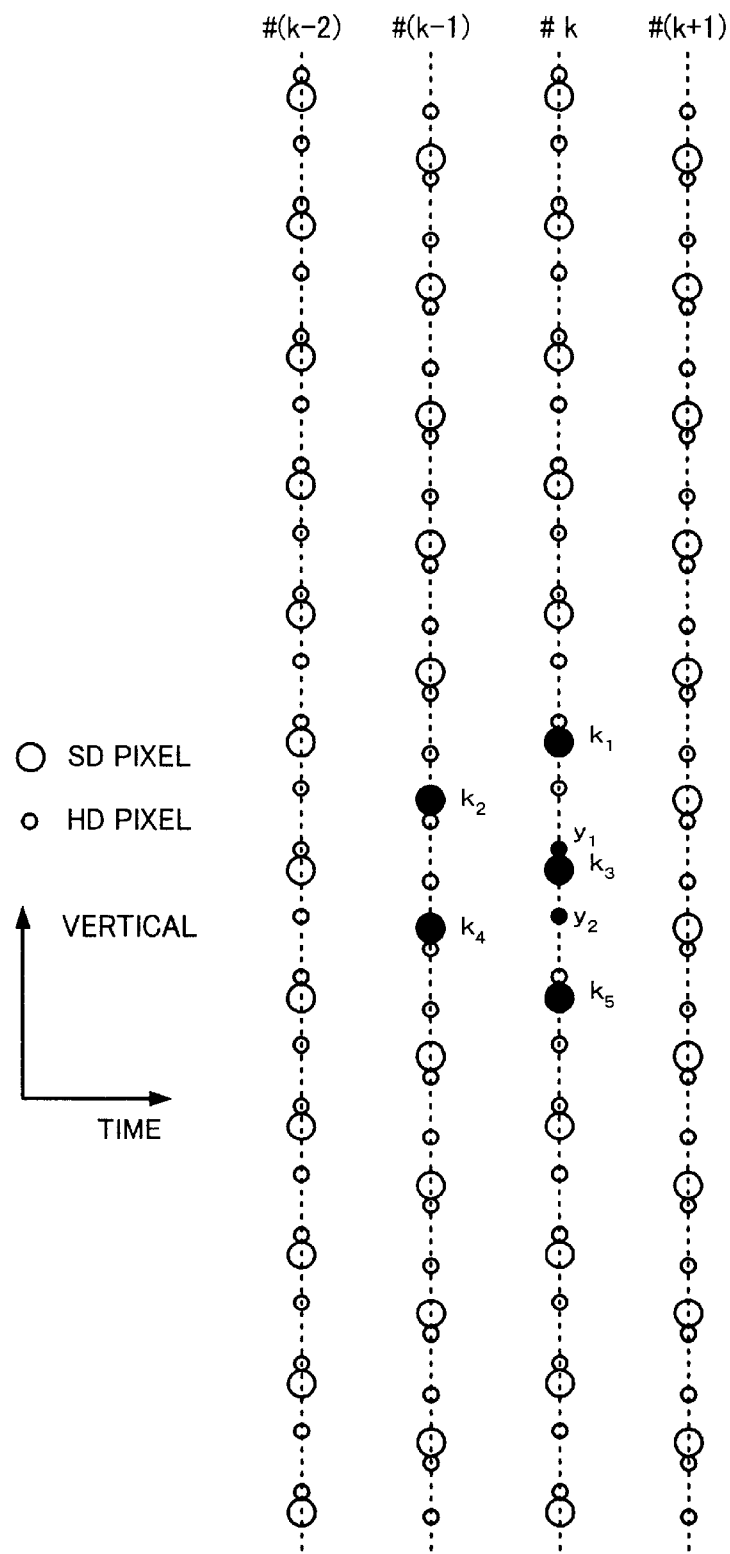
FIG. 10 is a schematic diagram showing an example of the arrangement of pixels used for detecting a spatial class according to the embodiment of the present invention.

The delaying circuit 12 delays the SD picture signal and supplies the resultant signal to a region extracting circuit 2. The region extracting circuit 2 extracts pixels necessary for determining a spatial class from the signal received from the delaying circuit 12 and supplies the extracted pixels to an ADRC circuit 3. FIG. 10 shows an example of the arrangement of SD pixels extracted by the region extracting circuit 2. The delaying circuit 12 compensates an input timing against the region extracting circuit 2.

The ADRC circuit 3 performs a calculation for compressing the output signal of the region extracting circuit 2 (for example, SD data of eight bits into SD data of two bits) so as to pattern the received SD picture signal as a spatial waveform with a smaller number of bits. The ADRC method is an adaptive re-quantizing method developed for a high efficient encoding process for use with a VCR (Video Tape Recorder). Since the ADRC method allows a local pattern of a signal level to be effectively represented with a short word length, according to the embodiment of the present invention, the ADRC method is used to generate a spatial :class categorization code. In the ADRC method, the re-quantizing process is performed by equally dividing the length between the maximum value MAX and the minimum value MIN by a designated bit length corresponding to the following formula (5).

$$DR=MAX-MIN+1$$

$$Q=\{(L-MIN+0.5)\times 2/DR\} \qquad (5)$$

where DR represents the dynamic range of spatial class taps; n represents, the number bits assigned; L represents the data level of a pixel of a spatial class tap; Q represents a re-quantized code; and { } represents a truncation process.

According to the embodiment of the present invention, the ADRC circuit 3 compresses SD data of for example five pixels extracted by the region extracting circuit 2 into two bits each. Hereinafter, compressed SD data of five pixels are denoted by q1 to q5. The pattern compressed data is supplied to the class code generating circuit.

Next, the class categorizing process and the adaptive process will be briefly described.

First, the class categorizing process will be described.

Figure 11A:
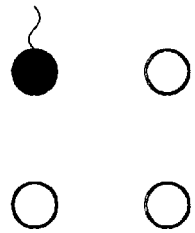
FIGS. 11A and 11B are schematic diagrams for explaining a class categorization adaptive process.
Figure 11B:
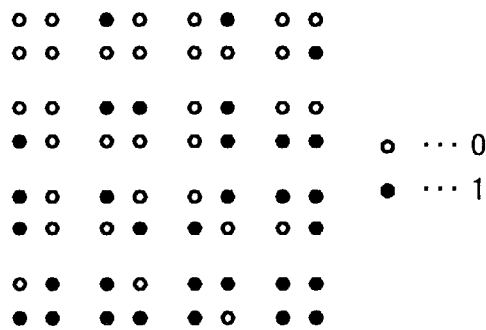

As shown in FIG. 11A, with a considered pixel and three pixels adjacent thereto, a block of (2×2 pixels) (this block is referred to as class categorization bloc:k) is formed. In this case, each pixel is represented by one bit ("0" or "1"). In this case, the block of (2×2 pixels) can be categorized as 16 ($=(2^1)^4$) patterns as shown in FIG. 11B. Such a pattern categorizing process is performed as a class categorizing process by a class categorizing circuit (not shown).

The class categorizing process may be performed in consideration of an activity (that represents the complexity) of a picture (of the block).

Normally each pixel is assigned for example eight bits. As described above, in this embodiment, a class categorization block is composed of nine (3×3) pixels with a considered pixel present at the center thereof. Thus, when the class categorizing process is performed for such a class categorization block, a huge number of classes of $(2^8)^9$ are obtained.

Thus, in the embodiment, the ADRC process is performed for a class categorization block by the ADRC circuit 25. Consequently, the number of bits of each pixel composing the class categorization block (thus, the number of classes) is reduced.

Figure 12A:
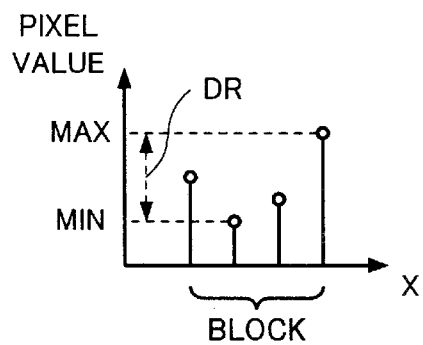
FIGS. 12A and 12B are schematic diagrams for explaining a bit reduction of pixels of a class categorization block.

For simplicity, as shown in FIG. 12A, a block composed of four pixels arranged on a straight line is considered. In the ADRC process, the maximum value and the minimum value of the pixel values of the four pixels are detected. The difference between the maximum value and the minimum value is defined as a local dynamic range namely, DR=MAX−MIN). Corresponding to the dynamic range DR, the pixel value of each pixel composing the block is re-quantized to K bits.

Figure 12B:
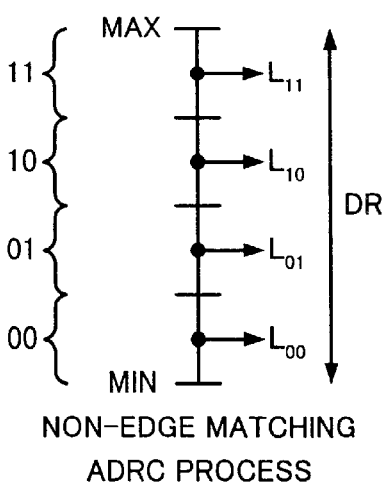

In other words, the minimum value MIN is subtracted from each pixel value of the block. The resultant value is divided by $DR/2^k$. The resultant value is converted into an ADRC code. In the case of K=2, as shown in FIG. 12B, it is determined whether or not the resultant value is categorized as any region of which the dynamic range DR is divided by 4 ($=2^2$). When the resultant value is categorized as the lowest level region, the second lowest level region, the third lowest level region, or the highest level region, a two-bit code 00B, 01B, 10B, or 11B is assigned (where B represents a binary notation). In the decoding apparatus, the ADRC code 00B, 01B, 10B, or 11B is converted into $L_{00}$, $L_{01}$, $L_{10}$, or $L_{11}$, respectively (where $L_{00}$ is the center value of the lowest level, $L_{01}$ is the center value of the second lowest level, $L_{10}$ is the center value of the third lowest level, and $L_{11}$ is the center value of the highest level). By adding the resultant value and the minimum value, the decoding process is performed.

Such an ADRC process is referred to as non-edge matching process.

The ADRC process is described in for example U.S. Pat. No. 5,0049,990 that was granted to the applicant of the present invention.

When the ADRC process is performed with a smaller number of bits assigned to each pixel composing the block, the number of classes can be reduced.

Figure 13:
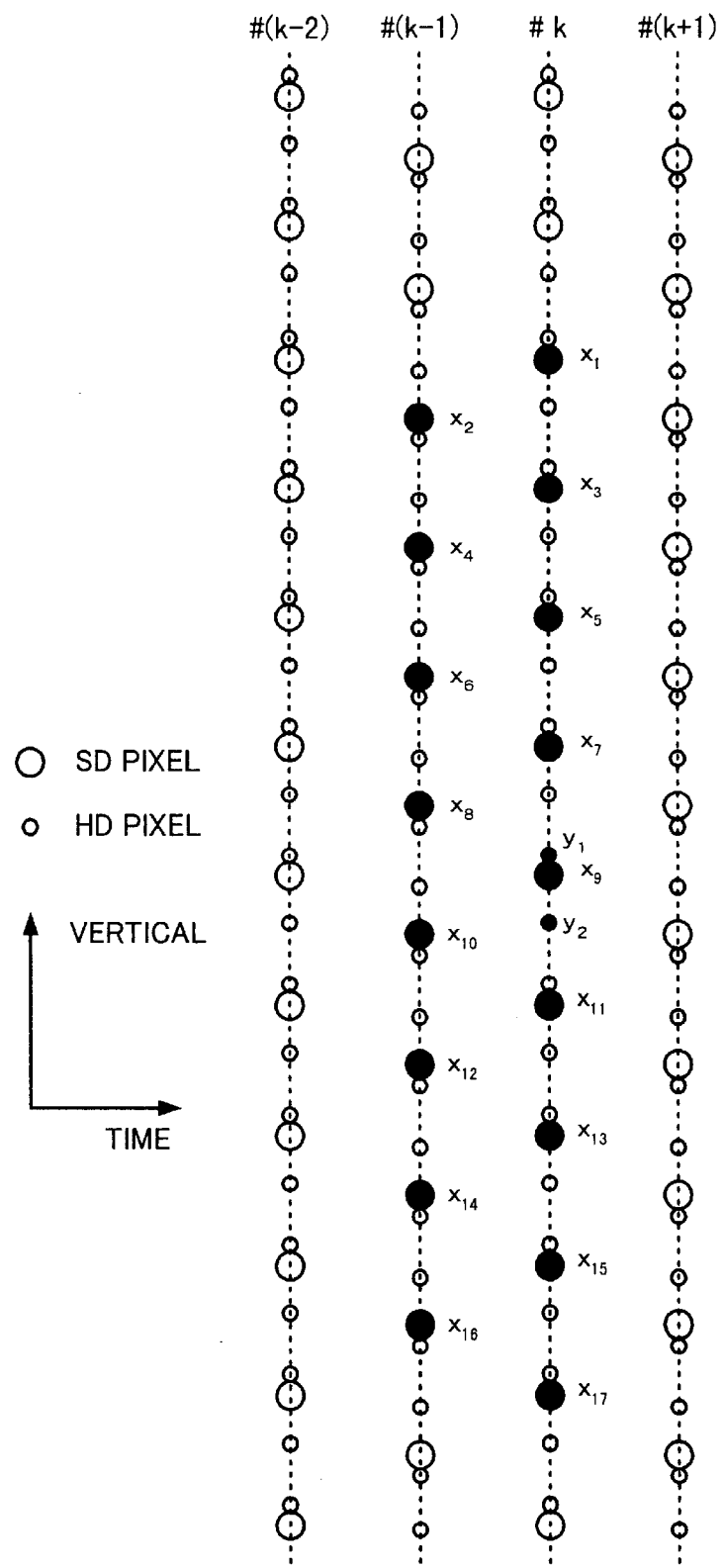
FIG. 13 is a schematic diagram showing an example of the arrangement of pixels used for estimating pixels of an output picture signal according to the embodiment of the present invention.

On the other hand, the region extracting circuit 7 extracts pixels used for performing an estimation calculation from the output signal of the field-by-field data vertical inverting circuit 13. FIG. 13 shows an example of the arrangement of pixels extracted by the region extracting circuit 7. In this example, the region extracting circuit 7 extracts 17 pixels x1 to x17. An output signal of the region extracting circuit 7 is supplied to an estimation calculating circuit 10 through a delaying circuit 8. The delaying circuit 8 delays the output signal of the region extracting circuit 7 so as to compensate the timing of the process of the estimation calculating circuit 10.

On the other hand, the class code generating circuit 6 performs a calculation corresponding to the following formula (6) with a spatial class received from the ADRC circuit 3 and a motion class received from the motion class determining circuit 5. Thus, the class code generating circuit 6 detects a class of each block and supplies a class code class that represents the detected class to a memory 9.

$$\text{class} = \sum_{i=0}^{n} q_i(2^p)^i + \text{mv\_class} \cdot 2^{pn} \qquad (6)$$

In this case, the values of n and p are for example 5 and 2, respectively.

The memory 9 stores coefficient data (rom table) for each class. The coefficient data is used to calculate HD pixels corresponding to SD pixels. The memory 9 outputs coefficient data wi(class) as a read address corresponding to the class code class received from the class code generating circuit 6. The coefficient data is supplied to the estimation calculating circuit 10. The learning method of the coefficient data stored in the memory 9 will be described later.

The estimation calculating circuit 10. performs a calculation with the output signal of the region extracting circuit 7 through the delaying circuit 8 and the coefficient data wi (class) received from the memory 9 and generates HD pixels corresponding to the input SD pixels.

In reality, the estimation calculating circuit 10 performs a calculation corresponding to the following equation (7) with for example 17 SD pixels x1 to x17 extracted by the region extracting circuit 7 and the coefficient data wi(class) received from the memory 9 and obtains HD pixels corresponding to the SD pixels. As described above, coefficient data for the mode 1 and coefficient data for the mode 2 are independently provided. Thus, in the mode 1, the coefficient data for the block 1 is used, whereas in the mode 2, the coefficient data for the block 2 is used.

$$hd' = w1 \times x1 + w2 \times x2 + w3 \times x3 + \ldots + w17 \times x17 \qquad (7)$$

The resultant HD pixel data is supplied to a horizontal interpolation filter 11. As the horizontal interpolation filter 11, a conventional filter can be used. In other words, the signal supplied to the horizontal interpolation filter 11 is interpolated so as to double the number of pixels in the horizontal direction. An output signal of the horizontal interpolation filter 11 is obtained from an output terminal 14.

Figure 14:
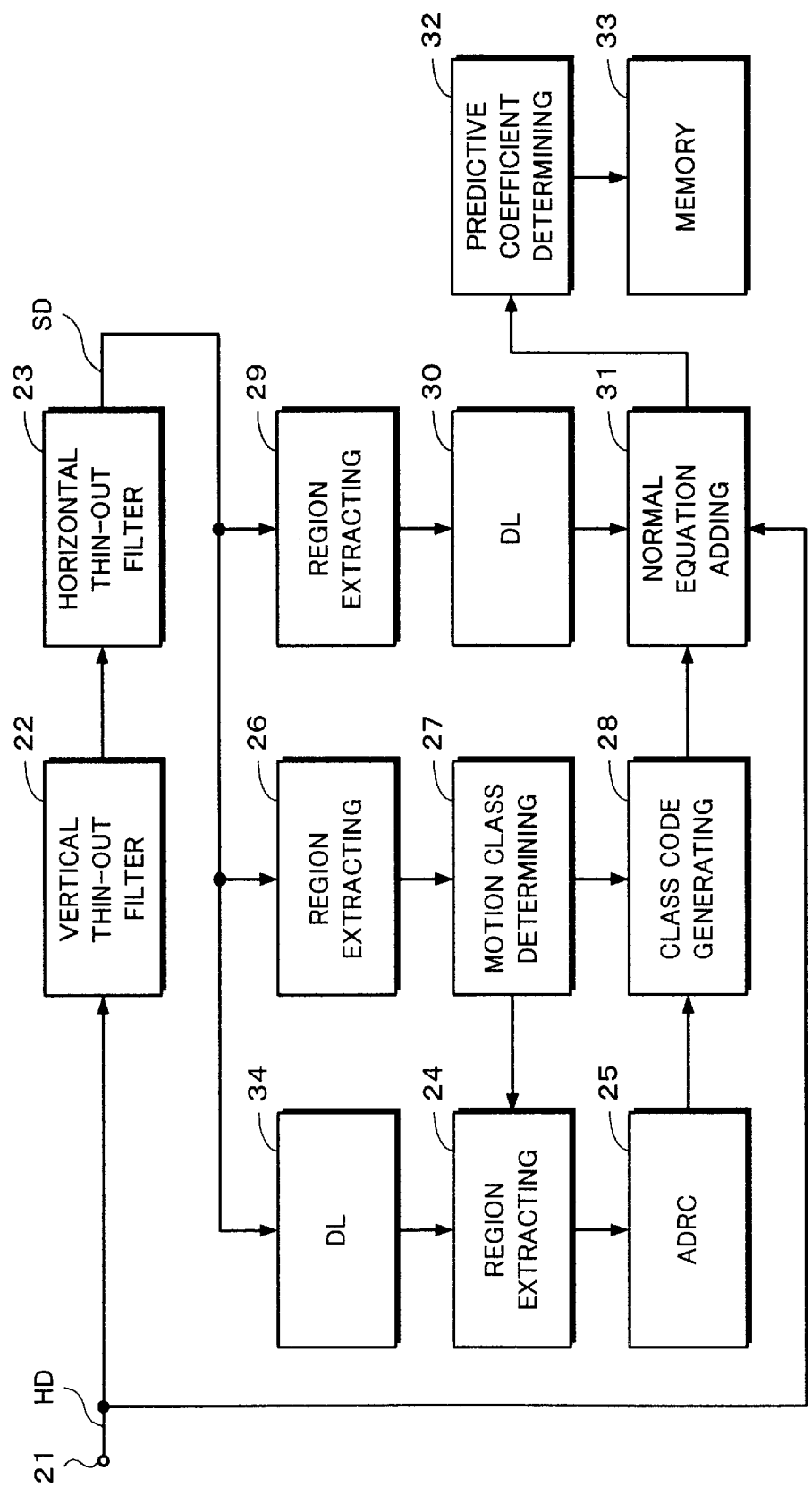
FIG. 14 is a block diagram showing an example of the structure of a predictive coefficient calculation process system according to the embodiment of the present invention.

Next, with reference to FIG. 14, the learning method of coefficient data stored in the memory 9 will be described. To learn the coefficient data, an SD picture signal corresponding to a known HD picture signal is generated so that the number of pixels of the SD picture signal is 1/4 that of the HD picture. In reality, a vertical thin-out filter 22 performs a thin-out process for the HD picture signal so that the frequency in the vertical direction of the field is halved. In addition, a horizontal thin-out filter 23 performs a thin-out process for the HD picture signal so that the frequency in the horizontal direction of the field is halved. The horizontal thin-out filter 23 outputs the SD picture signal with pixels 1/4 that of the HD picture signal. The SD picture signal is supplied from the horizontal thin-out filter 23 to region extracting circuits 26 and 29 and a delaying circuit 34.

As with the region extracting circuit 4 (shown in FIG. 8), the region extracting circuit 26 extracts data necessary for categorizing a motion class from the received SD picture signal and supplies the resultant data to a motion class determining circuit 27. As with the motion class determining circuit 5 (shown in FIG. 8), the motion class determining circuit 27 determines a motion class and supplies the determined motion class to a region extracting circuit 24 and a class code generating circuit 28.

The delaying circuit 34 delays the SD picture signal received from the horizontal thin-out filter 23 and supplies the resultant signal to the region extracting circuit 24. The region extracting circuit 24 extracts pixels necessary for determining a spatial class from the SD picture signal and supplies the extracted pixels to an ADRC circuit 25. The delaying circuit 34 is disposed so as to compensate the deviation between the timing of the signal supplied to the motion class region extracting circuit 24 and the timing of the signal received from the horizontal thin-out filter 23. The deviation takes place due to the operation time of the motion class determining circuit 27.

The ADRC circuit 25 detects a pattern of a one-dimensional level distribution or two-dimensional level distribution of the received SD picture signal and performs a calculation for compressing the output signal of the region extracting circuit 24 (from for example SD data of eight bits into SD data of two bits). The resultant pattern compressed data is supplied to a class, code generating circuit 28. The operation of the class code generating circuit 28 is similar to that of the class code generating circuit 6 (shown in FIG. 8). In other words, the class code generating circuit 28 performs a calculation with the received pattern compressed data (spatial data) and the motion class received from the motion class determining circuit 27, detects a class of each class, and supplies a class code that represents each class to a normal equation adding circuit 31.

On the other hand, the operation of the region extracting circuit 29 is the same as that of the region extracting circuit 7 (shown in FIG. 8). In other words, the region extracting circuit 29 extracts SD pixels used for an estimation calculation for generating pixels from the SD picture signal that is output from the horizontal thin-out filter 23. An output signal of the region extracting circuit 29 is supplied to the normal equation adding circuit 31 through a delaying:circuit 30. The delaying circuit 30 delays the output signal of the region extracting circuit 29 so as to compensate the timing of the process of the normal equation adding circuit 31.

To explaining the operation of the normal equation adding circuit 31, a learning process for a predictive expression for converting a plurality of SD pixels into one HD pixel and a signal converting process using the predictive expression will be described. In the following, a general case of which an HD pixel is predicted with n SD pixels will be described. The levels of n SD pixels are denoted by x1, x2, x3, ..., and xn. The levels x1, x2, x3, ..., and xn are re-quantized by p-bit ADRC method and the resultant data is denoted by q1, q2, q3, ..., and qn, respectively. The class class of the region that contains the levels x1, ..., and xn of the n SD pixels are defined corresponding to the formula (6)

A linear expression with n taps of coefficients w1, ..., and wn learnt for each class is given by the following formula (8). The coefficients w1, ..., and wn are learnt. Thus, before the coefficients w1, ..., and wn are learnt, they are indeterminate coefficients.

$$y = w1 \times x1 + w2 \times x2 + \ldots + xn \qquad (8)$$

The learning process is performed for a plurality of pieces of picture signal data (referred to as training data). When the number of pieces of the training data is m, the following formula (9) is given corresponding to formula (1).

$$y = w1 \times xk1 + w2 \times xk2 + \ldots + wn \times xkn \qquad (9)$$

where k=1, 2, ..., m.

In the case of m>n, since the predictive coefficients w1, ..., and wn are not uniquely defined, elements ek of an error vector e are defined by the following formula (10). Predictive coefficients that minimize the error vector e defined by formula (11) are obtained. In other words, predictive coefficients are uniquely obtained by so-called method of least squares.

$$ek = yk - \{w1 \times xk1 + w2 \times xk2 + \ldots + wn \times xkn\} \quad (10)$$

where k=1, 2, ..., m.

$$e^2 = \sum_{k=0}^{m} e_k^2 \quad (11)$$

To obtain predictive coefficients that minimize $e^2$ of formula (11), $e^2$ is partially differentiated with predictive coefficients wi (where i=1, 2, ...) (formula (12)). Each predictive coefficient wi is defined so that the partial differential value of each value of i becomes 0.

$$\frac{\partial e^2}{\partial w_i} = \sum_{k=0}^{m} 2\left(\frac{\partial e_k}{\partial w_i}\right) e_k = \sum_{k=0}^{m} 2 x_{ki} \cdot e_k \quad (12)$$

Next, a practical process for defining each predictive coefficient wi corresponding to formula (12) will be described. When Xji and Yi are defined as formulas (13) and (14), formula (12) can be written as a matrix of formula (15).

$$X_{ji} = \sum_{p=0}^{m} x_{pi} \cdot x_{pj} \quad (13)$$

$$Y_i = \sum_{k=0}^{m} x_{ki} \cdot y_k \quad (14)$$

$$\begin{bmatrix} x_{11} & x_{12} & \ldots & x_{1n} \\ x_{21} & x_{22} & \ldots & x_{2n} \\ \ldots & \ldots & \ldots & \ldots \\ x_{n1} & x_{n2} & \ldots & x_{nn} \end{bmatrix} \begin{bmatrix} w_1 \\ w_2 \\ \ldots \\ w_n \end{bmatrix} = \begin{bmatrix} Y_1 \\ Y_2 \\ \ldots \\ Y_n \end{bmatrix} \quad (15)$$

Formula (15) is referred to as normal equation. The normal equation adding circuit 31 performs an addition corresponding to the normal equation with a class code received from the class code generating circuit 28, the SD pixel data x1, x2, x3, ..., and xn received from the region extracting circuit 30, and the level y of the HD pixel as the training data received from the input terminal 21 and obtains Xji and Yi corresponding to formulas (13) and (14).

After all training data has been input, the normal equation adding circuit 31 supplies normal equation data to a; predictive coefficient determining circuit 32. The predictive coefficient determining circuit 32 performs a calculation for solving the normal equation corresponding to a conventional matrix solution such as sweep-out method with the supplied normal equation data and obtains predictive coefficients wi. The calculated predictive coefficients wi are supplied to a memory 33. The memory 33 stores the predictive coefficients wi for individual classes.

In the above-described learning process, the memory 33 stores predictive coefficients for predicting HD pixel data y for each class that is statistically the closest to a real value. The coefficient data stored in the memory 33 is loaded to the memory 9 shown in FIG. 8. As described above, the coefficient data is used for the picture information converting process. The coefficient data can be used for both an 1050*i* signal and a 525*p* signal as an HD picture signal.

According to the embodiment of the present invention, with a 525*i* signal as an input SD picture signal, both a 1050*i* signal and a 525*p* signal are output as output HD picture signals. However, it should be noted that the combination of an SD picture signal and an HD picture signal is not limited to the above-described example. Thus, the present invention can be applied for an apparatus that selectively performs an SD picture signal inverting process and thereby outputs two or more types of HD picture signals.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A picture information converting apparatus for converting an input picture signal of one type to an output picture signal of the same or different type and with a scanning line structure different from the scanning line structure of said input picture signal, comprising:

field-by-field vertical inverting means for selectively performing or not performing a vertical inverting process on the input picture signal for each field of the input picture signal as a function of the relationship between the type of the input picture signal and the type of the output picture signal;

picture extracting means for extracting picture data at a predetermined position of the vertical inverting processed input picture signal;

class code generating means for generating a class code as a function of picture data extracted from a picture signal;

storing means for storing conversion information data for each generated class code; and output picture generating means for generating said output picture signal as a function of said stored conversion information data and picture data extracted from an input picture signal.

2. The picture information converting apparatus of claim 1, wherein said picture extracting means includes a first extractor for extracting first picture data and outputting the extracted first picture data to said class code generating means and a second extractor for extracting second picture data and outputting the extracted second picture data to said output picture generating means.

3. The picture information converting apparatus of claim 1, wherein said conversion information data comprises predetermined coefficient data for each class code.

4. The picture information converting apparatus of claim 3, wherein said coefficient data exhibit values to minimize differences between a linear combination of real pixel values of a predetermined picture signal of the same type as the output picture signal and the output picture signal generated by said output picture generating means.

5. The picture information converting apparatus of claim 1, wherein said field-by-field vertical inverting means vertically inverts the input picture signal for each field when the input picture signal is an interlace picture signal with 525 scanning lines and the output picture signal is an interlace picture signal with 1050 scanning lines.

6. The picture information converting apparatus of claim 1, wherein said field-by-field vertical inverting means does not vertically invert the input picture signal for each field when the input picture signal is an interlace picture signal with 525 scanning lines and the output picture signal is a progressive scan picture signal with 525 scanning lines.

7. A picture information converting method for converting an input picture signal of one type to an output picture signal of the same or different type and with a scanning line structure different from the scanning line structure of said input picture signal, comprising the steps of:

selectively performing or not performing a vertical inverting process on the input picture signal for each field of the input picture signal as a function of the relationship between the type of the input picture signal and the type of the output picture signal;

extracting picture data at a predetermined position of the vertical inverting processed input picture signal;

generating a class code as a function of the picture data extracted from a picture signal;

storing conversion information data for each generated class code; and generating said output picture signal as a function of said stored conversion information data and picture data extracted from an input picture signal.

8. The method of claim 7 wherein the picture data is extracted by extracting and outputting first picture data from which the class code is generated; and extracting and outputting second picture data from which the output picture signal is generated.

9. The method of claim 7 wherein said conversion information data comprises predetermined coefficient data for each class code.

10. The method of claim 9, wherein said coefficient data exhibits values to minimize differences between a linear combination of real pixel values of a predetermined picture signal of the same type as the output picture signal and said generated output signal.

11. The method of claim 7, wherein the input picture signal is subjected to vertical inverting processing for each field when the input picture signal is an interlace picture signal with 525 scanning lines and the output picture signal is an interlace picture signal with 1050 scanning lines.

12. The method of claim 7, wherein the input picture signal is not subjected to vertical inverting processing for each field when the input picture signal is an interlace picture signal with 525 scanning lines and the output picture signal is a progressive scan picture signal with 525 scanning lines.

13. Picture information converting apparatus for converting an input picture signal of one type to an output picture signal of the same or different type and with a scanning line structure different from the scanning line structure of the input picture signal, comprising:

field-by-field vertical inverting means for selectively performing a vertical inverting process on the input picture signal for each field as a function of the relationship between the type of the input picture signal and the type of the output picture signal;

first picture extracting means for extracting first picture data at a first predetermined position of the input picture signal;

motion class detecting means for determining a motion class that represents motion of the extracted picture data and for producing motion class information representative thereof;

second picture extracting means for extracting second picture data at a second predetermined position of the input picture signal;

spatial class detecting means for detecting a level distribution pattern of the second extracted picture data and for determining a spatial class of the picture data as a function of the detected pattern, and for producing spatial class information representative thereof;

class code generating means for combining said motion class information and said spatial class information to produce class codes;

storing means for storing predetermined coefficient data corresponding to said class codes;

third picture extracting means for extracting third picture data at a third predetermined position of the input picture signal; and calculation means for estimating an output picture signal as a function of the combination of a class code, coefficient data corresponding to said class code and said third extracted picture data.

14. The picture information converting apparatus of claim 13, wherein the coefficient data exhibits values to minimize the differences between a linear combination of real pixel values of a predetermined picture signal of the same type as the output picture signal, and said third extracted picture data.

15. The picture information converting apparatus of claim 13, wherein said field-by-field vertical inverting means vertically inverts the input picture signal for each field when the input picture signal is an interlace picture signal with 525 scanning lines and the output picture signal is an interlace picture signal with 1050 scanning lines.

16. The picture information converting apparatus of claim 13, wherein said field-by-field vertical inverting means does not vertically invert the input picture signal for each field when the input picture signal is an interlace picture signal with 525 scanning lines and the output picture signal is a progressive scan picture signal with 525 scanning lines.

17. A method for converting an input picture signal of one type to an output picture signal of the same or different type and with a scanning line structure different from the scanning line structure of the input picture signal, comprising the steps of:

selectively performing a vertical inverting process on the input picture signal for each field as a function of the relationship between the type of the input picture signal and the type of the output picture signal;

extracting first picture data at a first predetermined position of the input picture signal;

determining a motion class that represents motion of the first extracted picture data and producing motion class information representative thereof;

extracting second picture data at a second predetermined position of the input picture signal;

detecting a level distribution pattern of the second extracted picture data, and determining a spatial class of the picture data as a function of the detected pattern, and producing spatial class information representative thereof;

combining said motion class information and said spatial class information to produce class codes;

storing predetermined coefficient data corresponding to said class codes;

extracting third picture data at a third predetermined position of the input picture signal; and estimating an output picture signal as a function of the combination of a class code, coefficient data corresponding to said class code and said third extracted picture data.

18. The method of claim 17, wherein the coefficient data exhibits values to minimize differences between a linear combination of real pixel values of a predetermined picture signal of the same type as the output picture signal; and said third extracted picture data.

19. The method of claim 17, wherein field-by-field vertical inverting processing is performed when the input picture signal is an interlace picture signal with 525 scanning lines and the output picture signal is an interface picture signal with 1050 scanning lines.

20. The method of claim 17, wherein field-by-field vertical inverting processing is not performed when the input picture signal is an interlace picture signal with 525 scanning lines and the output picture signal is a progressive scan picture signal with 525 scanning lines.

* * * * *